April 21, 1931. W. H. MARR 1,802,152
AUTOMATIC PHONOGRAPH
Filed April 18, 1925 9 Sheets-Sheet 1

Inventor
William H. Marr
By Green and McCallister
Attys.

April 21, 1931.  W. H. MARR  1,802,152
AUTOMATIC PHONOGRAPH
Filed April 18, 1925  9 Sheets-Sheet 2

April 21, 1931.  W. H. MARR  1,802,152
AUTOMATIC PHONOGRAPH
Filed April 18, 1925    9 Sheets-Sheet 3

Inventor:
William H. Marr
By Green and McCallister
Attys.

April 21, 1931.  W. H. MARR  1,802,152
AUTOMATIC PHONOGRAPH
Filed April 18, 1925   9 Sheets-Sheet 4

Inventor:
William H. Marr
By Green and McCallister
Attys.

April 21, 1931.  W. H. MARR  1,802,152
AUTOMATIC PHONOGRAPH
Filed April 18, 1925  9 Sheets-Sheet 5

Inventor:
William H. Marr
By Green and McCallister
Attys

Patented Apr. 21, 1931

1,802,152

UNITED STATES PATENT OFFICE

WILLIAM H. MARR, OF PORT ARTHUR, TEXAS

AUTOMATIC PHONOGRAPH

Application filed April 18, 1925. Serial No. 24,096.

This invention relates to phonographs and more particularly to those of the automatic type.

An object of this invention is to provide a phonograph which will automatically play any number of records without requiring any attention whatever.

A further object is to provide a phonograph having a simple mechanism for removing a record after playing and substituting on the record table another record.

A still further object is to provide a phonograph, for the purpose set forth, which will have comparatively few parts, be of simple construction, and positive and reliable in operation.

These and other objects which will be obvious to those skilled in this particular art are accomplished by means of this invention, one embodiment of which is shown in the accompanying drawings, in which.

The particular embodiment of this invention which has been chosen for the purposes of illustration contemplates the provision of a magazine for supporting records to be played at one side of the phonograph cabinet. A swinging transfer or loading arm is mounted on the cabinet between this stack of records in the magazine and the rotatable record table of the phonograph. At the proper time, during the operation of the phonograph, the loading arm is operated so as to lift a record from the magazine, swing it into position over the phonograph table and deposit it thereon in the proper position. A receiver for played records is provided at the opposite side of the phonograph cabinet and an unloading arm, which is similar in construction to the loading arm, is mounted on the cabinet for swinging movement between the phonograph table and the receiver for played records. A mechanism is provided for operating the unloading arm so as to remove a played record from the table, swing it into position over the receiver and deposit it thereon while the loading mechanism is transferring a record from the magazine table.

Prior to the operation of the loading and unloading mechanisms the tone arm, which is of special construction, is raised so as to lift the needle out of engagement with the played record and is swung into an inoperative position where it will not interfere with the removal of the played record nor the proper positioning of an unplayed record.

A mechanism has been provided for stopping the rotation of the phonograph table during the above described operations, but such a device is not absolutely essential to the proper functioning of this invention.

When the unplayed record has been deposited upon the table the latter is again caused to rotate and the tone arm and needle are moved into operative playing position.

The drawings illustrate the transfer arms as having magnetic means for engaging and lifting the records. With such a mechanism it is, of course, necessary to provide each record with a metal disc or similar device to complete the magnetic circuit and thereby enable the magnets to lift the records. It will, however, be obvious that other types of lifting means may be provided in place of the magnets such, for example, as vacuum cups or similar devices.

The phonograph illustrated in the drawings includes the usual cabinet 20 and rotatable record table 21 which is adapted to be rotated by an improved form of mechanism hereinafter more fully described.

Loading mechanism

An outwardly extending bracket 22 is mounted on one side of the cabinet and supports a magazine for unplayed records in spaced relation thereto, see Figs. 1 to 4. The magazine includes a record supporting disc 23 mounted on a hollow, threaded stem 24 which is non-rotatably mounted in upper and lower bearing sleeves 25 and 26 formed in the outer end of the bracket 22; the supporting disc seating on the top face of the upper bearing sleeve 25 when in its lower most position. A spline 27 is provided between the stem and the lower bearing sleeve 26 so as to permit relative vertical movement thereof and at the same time prevent rotation of the stem and disc 23. A nut 28 engages the threads of the stem 24 and is confined between the bearing sleeves 25 and 26. A gear 29 is integrally formed on the nut and is adapted to be rotated by means of a gear 30 formed on the end of an inwardly extending shaft 31 mounted in suitable bearings supported on the bracket 22. The inner end of the shaft has a sprocket 32 rotatably mounted thereon and connected by a chain 33 with a second sprocket 34 mounted on a shaft 35 which is rotatably supported in a suitable bracket 36 secured to the rear of the phonograph cabinet. A worm wheel 37 is secured to the inner end of the shaft 35 and meshes with a worm 38 formed on the shaft 39 of a transfer mechanism driving motor 40, the operation of which is controlled as more fully hereinafter described. The sprocket 32 is adapted to be locked to the shaft 31 by means of a clutch which is capable of being manually controlled. The clutch consists of a hub 42 of a hand wheel 43 splined to the shaft 31 and is provided with clutch teeth which are adapted to engage similarly located teeth formed on the hub of the sprocket 32. Rotation of the shaft 31, through the driving connections described, causes the nut 28 to revolve and raise the supporting disc 23 after a record has been transferred therefrom so as to position the next record in the stack at the proper height to be engaged by the loading arm. A pin 41 extends upwardly above the supporting disc 23 for insuring the proper positioning of the unplayed records thereon.

When the phonograph is started the proper height for the record supporting disc 23 will depend upon the number of records in the stack to be played and the hand wheel 43 may be moved along the shaft 31 to disengage the clutch teeth 43 from the hub of the sprocket 32. The disc 23 can then be manually placed in starting position at the proper level by turning the hand wheel after it has been slid out of engagement with the sprocket 32. After setting the disc 23 at the proper height the hand wheel is moved to bring the clutch teeth into engagement with the sprocket 32 so that future rotation of the latter will be transmitted to the nut 28.

A loading transfer arm 44, adapted to lift the top record from the stack of records in the magazine and to deposit it upon the phonograph table, is mounted for both swinging and vertical movements in brackets 45 secured to the side of the phonograph cabinet adjacent the magazine for unplayed records. A magnetic lifting device 46 shown in Fig. 8 as being in the form of an electro-magnet, is secured to the outer end of the transfer arm and is adapted to lift a record by means of a metal disc or the like which is secured to the record at the center thereof.

The loading arm is lifted vertically by means of a lever 47 which is pivoted at 48 to the side of the phonograph cabinet and is provided with a forked end 49 which engages a groove 50 formed in a lifting collar 51 secured to a shaft 52 which supports the transfer arm. The loading arm lifting lever 47 is oscillated so as to raise and lower the loading arm by means of a cam 53 secured to a cam shaft 54 mounted on the back of the phonograph cabinet. The weight of the transfer arm and its supporting shaft is sufficient to maintain the outer end of the lever 47 in engagement with the face of the lifting cam 53.

The cam shaft 54 is rotated by means of a gear 55 which is secured thereto and which meshes with a gear 56 mounted on the counter shaft 35.

When in its raised position the transfer arm is adapted to be swung through an arc of 180 degrees by means of a lever 57 mounted upon a pivot 58 on the phonograph cabinet. The lower end of the lever is provided with a toothed segment 59 meshing with a gear 60 splined to the loading arm supporting shaft 52 and mounted in a support 61, see Fig. 3. The swinging lever 57 is oscillated upon its supporting pivot by means of a link 62 which connects the upper end of the lever with the upper end of an actuating lever 63 which is pivotally mounted in a bracket above the cam shaft 54. The lower end of the lever 63 engages a cam 64 secured to the cam shaft.

Unloading mechanism

Figure 5:
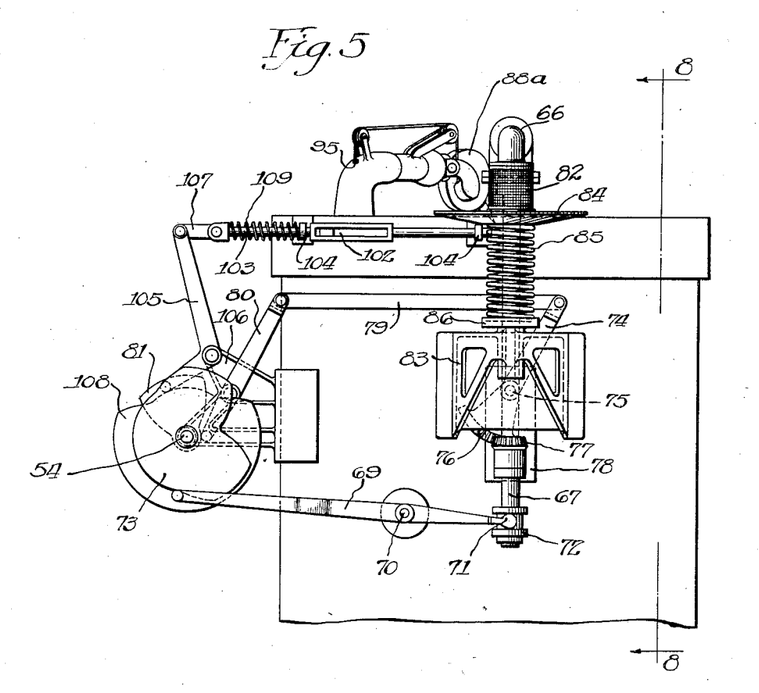
Fig. 5 is an elevation of the opposite side of the phonograph, showing the receiver for played records.
Figure 6:
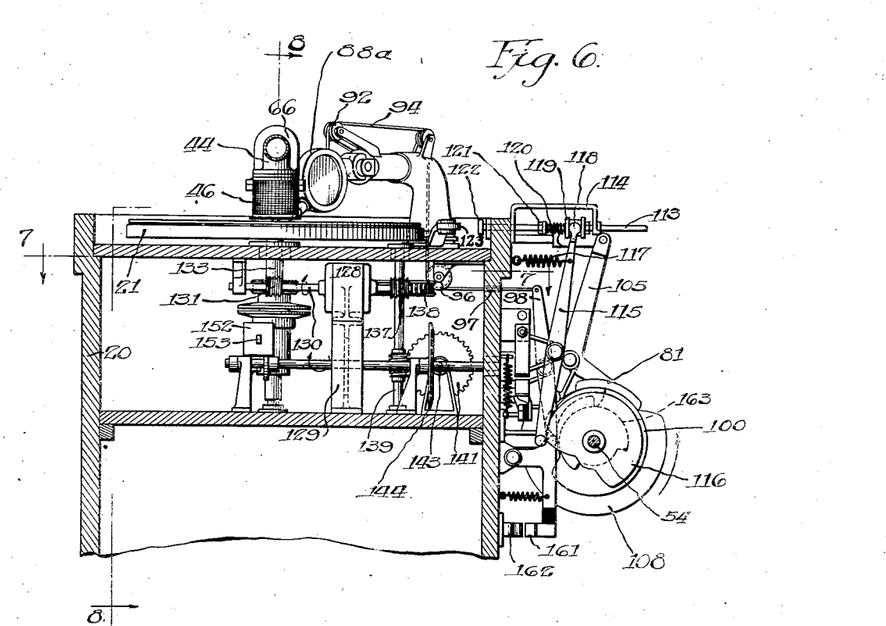
Fig. 6 is a vertical cross section on the line 6—6 of Fig. 1.
Figure 7:
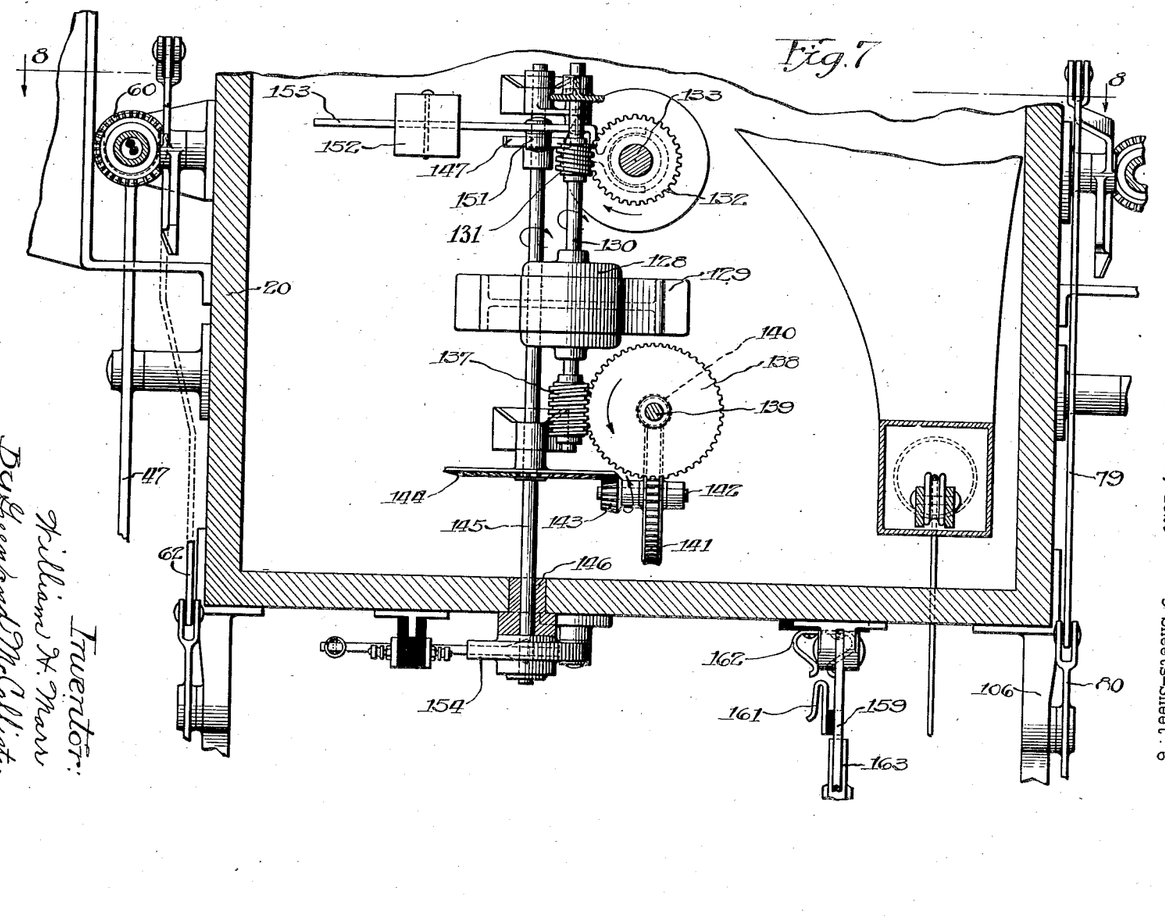
Fig. 7 is a horizontal sectional view on the line 7—7 of Fig. 6.

An unloading arm 66, which is similar in all respects to the loading arm 44, is mounted upon a shaft 67 which is rotatably and vertically movable in brackets 68 secured to the side of the phonograph cabinet. The unloading arm 66, see Fig. 5, is adapted to be raised and lowered in the same manner as the loading arm and by similar mechanisms. A lifting lever 69 is mounted upon a pivot 70 secured to the cabinet and has a fork 71 at its inner end engaging a lifting collar 72 secured to the unloading arm supporting shaft 67. The outer end of the lifting lever engages a lifting cam 73 secured to the cam shaft 54. When in raised position the supporting shaft 67 and unloading arm 66 are swung through an arc of 180 degrees by a lever 74 mounted on a pivot 75 on the phonograph cabinet and having a toothed segment 76 engaging a gear 77 mounted in a support 78 and splined to the shaft 67. The upper end of the unloading arm swinging lever is connected by a link 79 with an actuating lever 80 which is pivotally mounted on the rear of the cabinet and at its lower end engages a cam 81 mounted on the cam shaft 54. The unloading arm is provided with a magnetic lifting device 82 which is similar to the magnetic lifting device 46 of the loading arm.

A receiver for played records is mounted upon a supporting bracket 83 which extends outwardly from the side of the phonograph cabinet. The receiver consists of a disc-shaped support 84 on which the played records are deposited by the unloading arm. The support 84 is yieldingly mounted upon a spring 85 which seats in a spring support 86 secured to the bracket and a rod 87 extends downwardly through the bracket from the record support 84 for guiding the latter in its vertical movement. The strength of the supporting spring 85 is such that as the unloading arm deposits records on the disc support the spring yields sufficiently to allow the disc support to be lowered under the weight of the record so that the highest record in the stack of played records deposited on the receiver is below the path of the swinging unloading arm and does not interfere with the latter's movement or operation.

*Tone arm control*

Prior to the operation of the transfer mechanism, in moving the played record off the phonograph table and another record on to the table, it is necessary to move the tone arm and needle to an inoperative position where they will not interfere with the transfer of the records.

Figure 8:
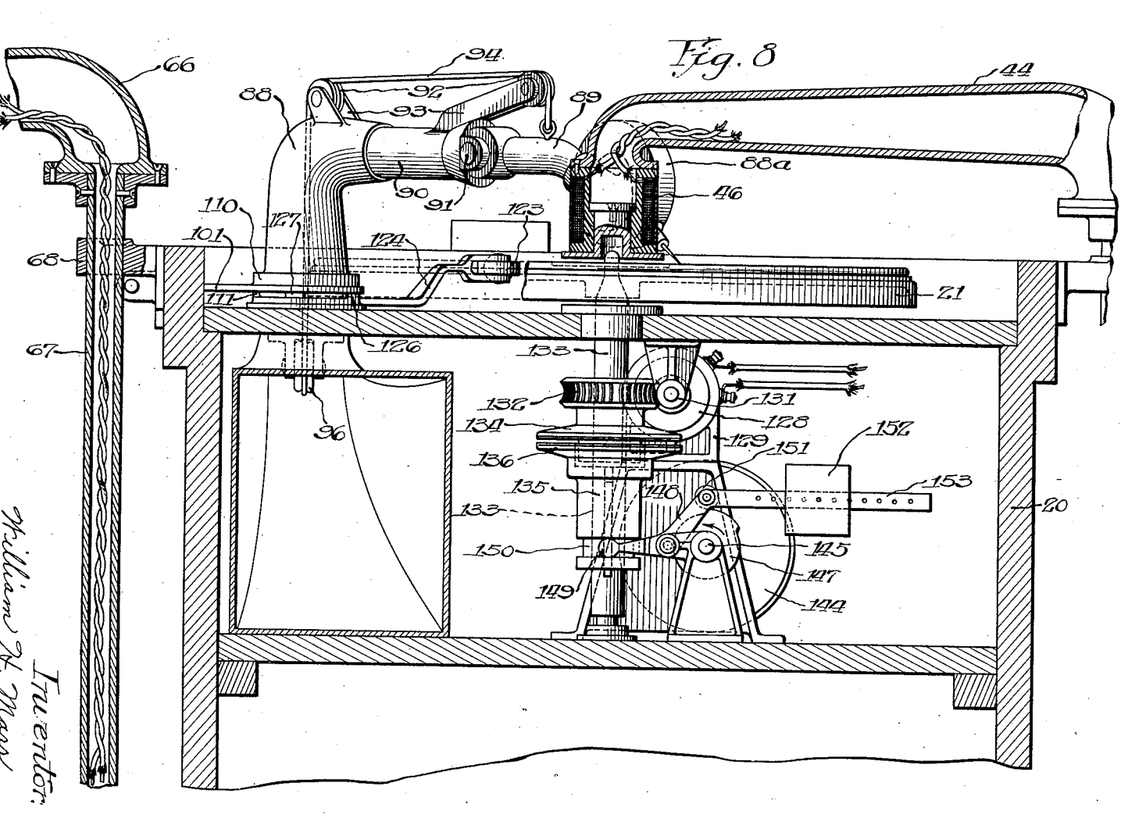
Fig. 8 is a vertical section on the line 8—8 of Fig. 6, showing the table driving mechanism in elevation.

In order to accomplish this automatically I provide a tone arm 88 of special construction, see Fig. 8, which is pivoted, as usual, on the top of the phonograph cabinet. The sound box 88ª, is shown mounted on a supporting section 89 which is connected to the rear sound transmitting elbow 90 by a suitably formed hinge 91 which permits the vertical movement of the sound box. Grooved rollers 92 are mounted in suitable brackets 93 which are spaced longitudinally of and formed on the sound transmitting elbow 90. A lifting cord 94 is connected at one end to the hinged section 89 of the tone arm and passes rearwardly over the rollers 92. From the rear roller 92 the sound box lifting cord passes through an opening 95 to the interior of the tone arm, see Fig. 2, thence downwardly to a roller 96 mounted within the phonograph cabinet and then outwardly through an opening 97 formed in the rear wall of the cabinet. The outer end of the lifting cord is secured to the upper end of a lever 98 pivotally mounted on a bracket 99 secured to the rear of the cabinet. The lower end of the sound box lifting lever 98 engages a lifting cam 100 secured to the cam shaft and by means of which the sound box and consequently the needle are raised after the playing of a record.

Figure 1:
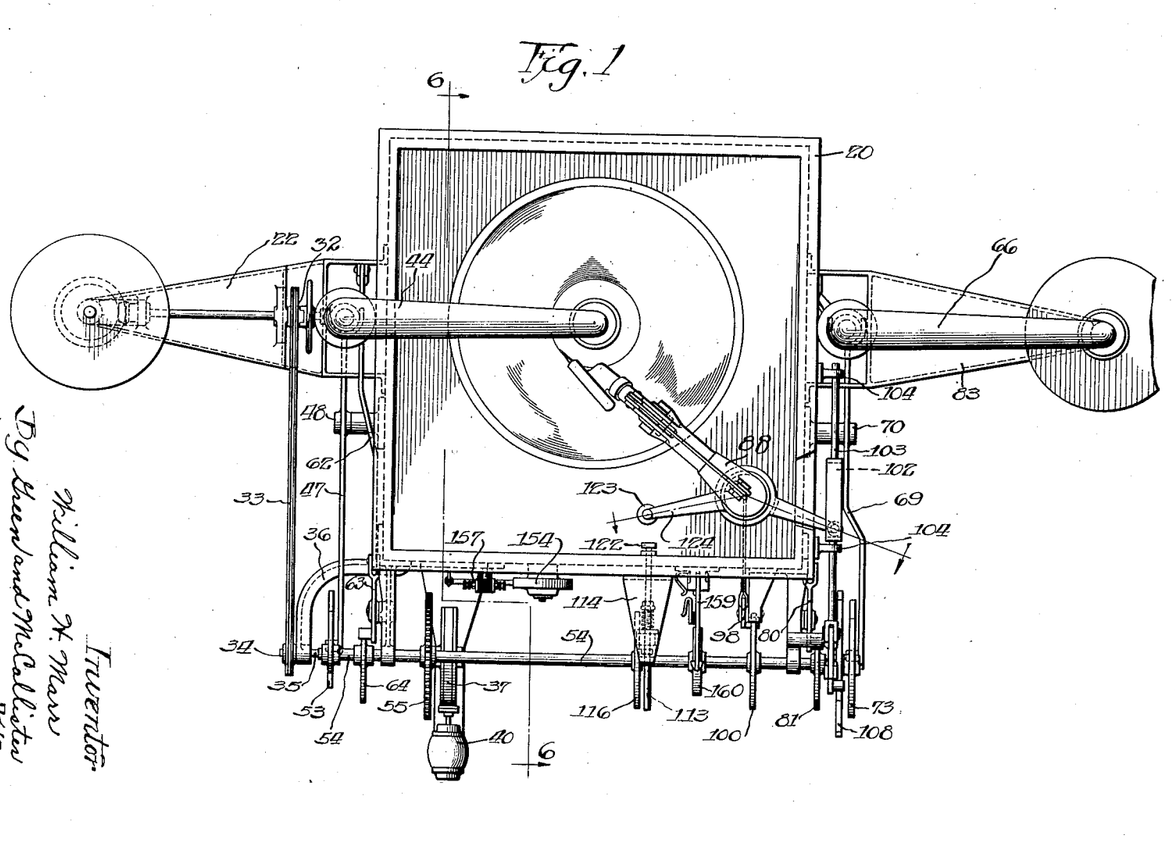
Figure 1 is a top plan view of a phonograph constructed in accordance with my invention.

When the needle has been raised the tone arm is swung to inoperative position at one side of the phonograph table by means of an outwardly extending arm 101 whose outer end is received within a slot 102 formed in a rod 103 which is slidably mounted in brackets 104 at the top of one side of the cabinet, see Figs. 1 and 5. The rod 103 is reciprocated in timed relation to the operation of the tone arm by means of a lever 105 which is pivoted to a bracket 106 above the cam shaft. The upper end of the lever 105 is connected to the outer end of the rod 103 by a suitable link 107 and the lower end of the lever engages a cam 108 on the cam shaft.

The lever 105 may be maintained in operative engagement with the cam 108 by any desired means such, for example, as a spring 109 which can be conveniently placed around the shaft 103 between one of the supporting brackets 104 and connecting link 107.

Figure 13:
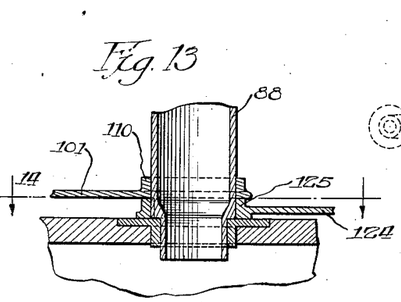
Fig. 13 is a vertical sectional view through the pivotal mounting of the tone arm.
Figure 14:
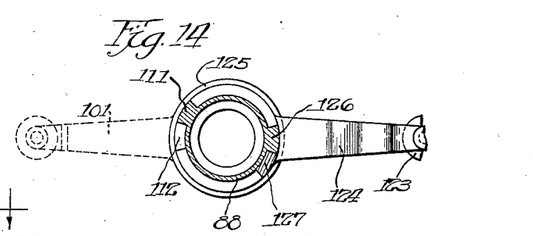
Fig. 14 is a horizontal cross section on the line 14—14 of Fig. 13.
Figure 15:
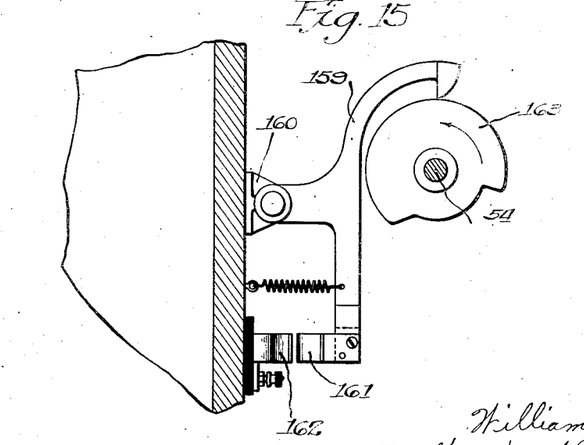
Fig. 15 is a side elevation of the cam control switch for timing the operation of the record transferring mechanisms.

As illustrated in Figs. 13 and 14 the tone arm shifting lever 101 is provided with a collar 110 which surrounds the tone arm adjacent the point at which it passes into the phonograph resonating passage. The collar 110 has a lug 111 which is adapted to engage a lug 112 formed on the tone arm so that when the cam 108 moves the tone arm shifting rod 103 inwardly the shifting lever 101 whose outer end is in engagement with the end of the lost motion slot 102, as shown in Fig. 1, is swung so as to bring the lug 111 into contact with the lug 112 and swinging the tone arm to an inoperative position. The return of the shifting rod 103, under the impulse of the spring 109, will not move the tone arm out of this inoperative position, due to the lost motion slot 102 and also to the fact that the collar 110 of the shifting lever 101 loosely surrounds the tone arm.

After a record to be played has been deposited upon the table the tone arm is moved into position, where the needle will engage the start of the playing groove, by means of a tone arm returning rod 113 which is slidably mounted in a bracket 114 at the top of the cabinet and which extends inwardly thereof. A tone arm return lever 115 is pivotally mounted in a suitable bracket on the rear of the cabinet and is adapted to be oscillated so as to reciprocate the rod 113 by means of a cam 116 secured to the cam shaft. The cam 116 is so designed that its high face operates to retract the rod 113 or move it outwardly. Inward movement of the rod is accomplished by means of a coil spring 117 which is mounted under tension between the upper part of the return lever 115 and the phonograph cabinet. The lever 115 is provided with a fork 118 which engages a groove formed in a rod shifting collar 119, slidably mounted on the tone arm return rod 113. A helical spring 120 is positioned between the shifting collar and a stop collar 121 secured to the tone arm return rod 113. By means of this mechanism the pressure of the tone arm return rod 113, which moves the tone arm into operative position to begin the playing of a record, is a resilient or yielding pressure.

The inner end of the return rod is provided with a button 122 which is adapted to operatively engage a roller 123 so as to move a tone arm returning lever 124, provided with a collar 125, see Figs. 13 and 14, which surrounds the tone arm above the collar 110 of the shifting lever 101. A lug 126 is adapted to engage a lug 127 formed on the tone arm so as to move the latter from its inoperative position into position over the edge of the record where the needle is lowered so as to engage the start of the playing groove.

Table operation

The record table 21 is adapted to be rotated by a motor 128 which is mounted upon a supporting bracket 129 in the motor compartment of the phonograph. The motor shaft 130 extends outwardly on each side of the motor and at one end is provided with a worm 131 adapted to drive a worm gear 132 which is loosely mounted upon a table supporting shaft 133 and which has one face 134 of a table driving friction clutch formed on an extension of the hub thereof. A driving collar 135 is splined to the lower end of the table driving shaft and has a clutch face 136 for cooperating with the face 134 formed on the worm gear. The other end of the motor shaft is provided with a worm 137 which meshes with and drives a timing gear 138 secured to a shaft 139 which is vertically mounted in the motor compartment. The shaft 139 has a worm 140 which drives a worm gear 141 suitably mounted on a stub shaft 142. A bevel gear 143 meshes with and drives a large gear 144 secured to a horizontal shaft 145. One end of this shaft 145 extends outwardly through the rear of the phonograph cabinet through a bearing bushing 146. The inner end of the shaft 145 is mounted in suitable bearings in the motor compartment and has a clutch operating cam 147 secured thereto. A clutch shifting lever 148 is pivoted adjacent the clutch operating cam and has a fork 149 formed at one end thereof and engaging a groove 150 formed in an extension of the collar 135 which is splined to the table shaft and which carries one of the clutch faces 136. The clutch shifting lever is provided with a cam follower 151 which is held in contact with the clutch operating cam by a weight 152 adjustably mounted on an extending arm 153 of the clutch shifting lever. The timing of the cam operating clutch is such that during the operation of the record transfer mechanism the sleeve 135 and clutch face 136 are lowered out of engagement with the driving face 134 so that rotation of the table during the transfer operation is stopped.

Transfer motor control

Figure 2:
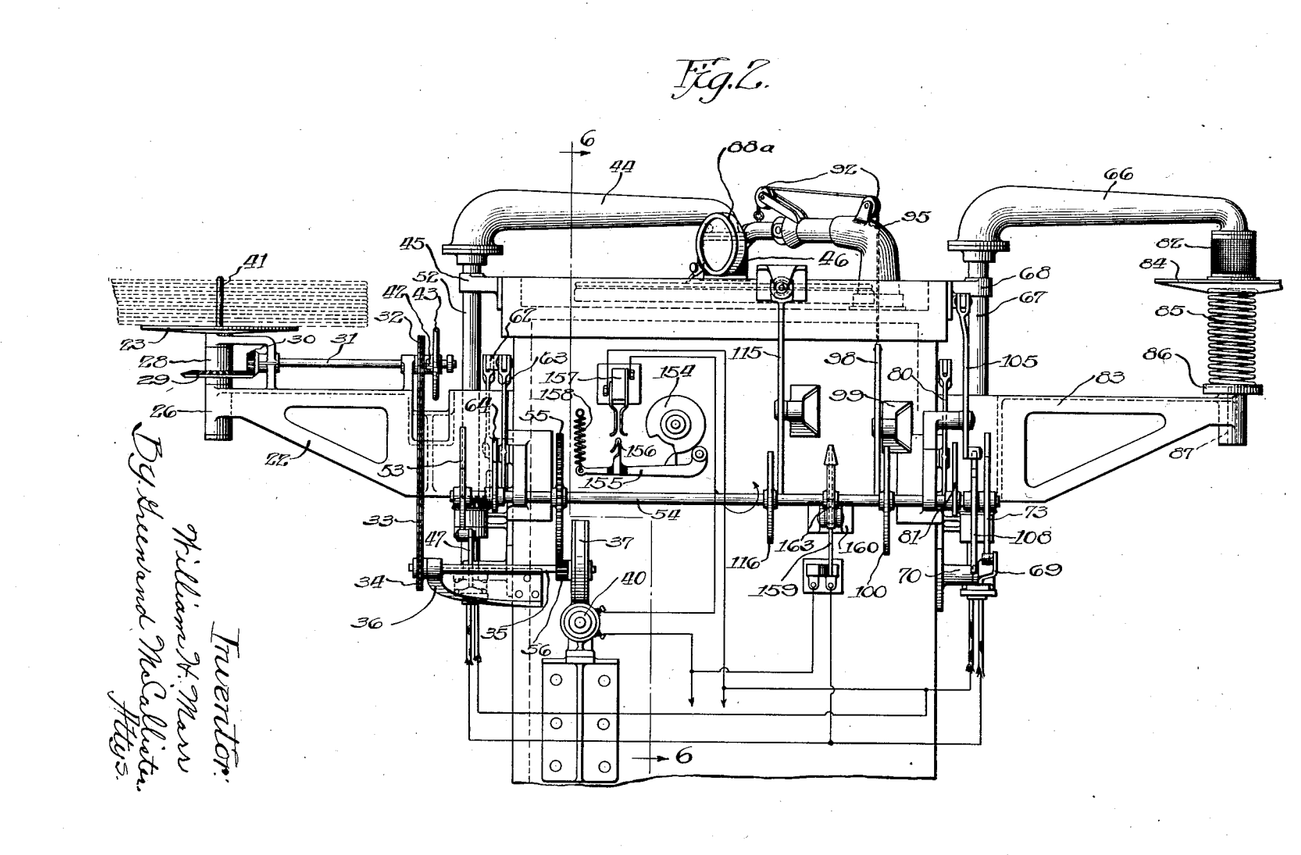
Fig. 2 is a rear elevation thereof.
Figures 3, 4:
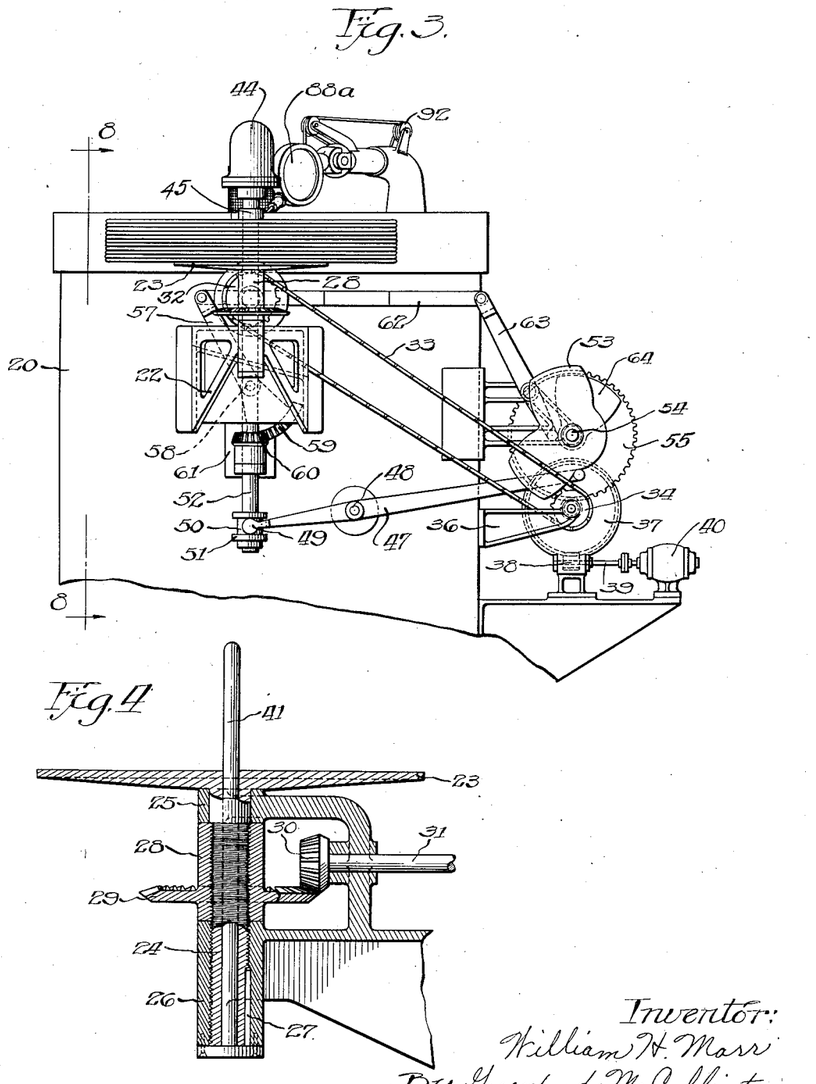
Fig. 3 is a side elevation, showing the magazine for unplayed records.
Fig. 4 is a vertical sectional view through a part of the magazine, showing means for feeding unplayed records into position for engagement with the loading arm.

A transfer motor control cam 154 is mounted on the outer end of the table motor driven shaft and a lever 155 having a contact 156 is adapted to be operated by the control cam so as to open and close a switch 157, see Fig. 2, which makes or breaks the current to the transfer mechanism operating motor 40. A spring 158 maintains the switch lever 155 in engagement with the control cam.

A similar switch operating lever 159 is pivoted to brackets 160 on the phonograph cabinet adjacent the cam shaft 54 and has a contact 161 for operating a switch 162 so as to control the operation of the magnetic lifting means 46 and 82 in the ends of the transfer arms. A magnet control cam 163 is secured to the cam shaft 54 so as to operate the magnet control switch 162 in timed relation to the operation of the transfer mechanism.

Figures 11, 12:
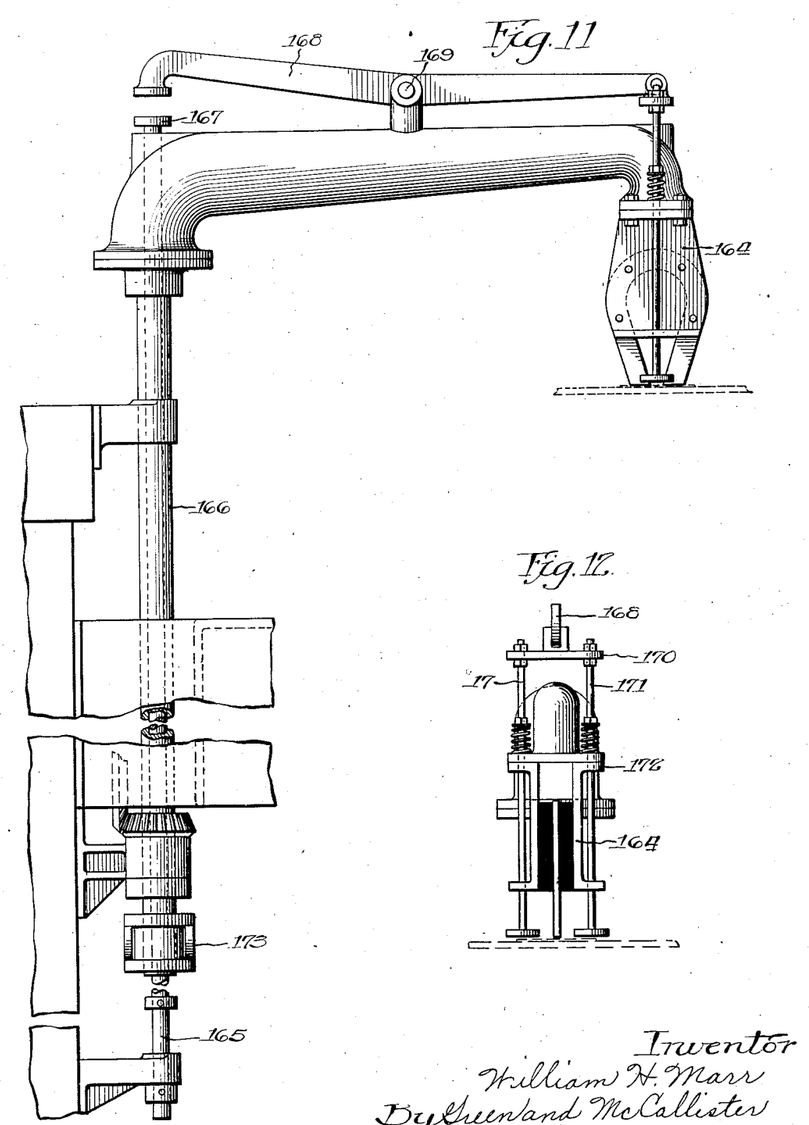
Fig. 11 is a side elevation of a modified form of transfer arm.
Fig. 12 is a view in elevation of the end of the arm shown in Fig. 11.

In Figs. 11 and 12 I have illustrated a modified form of lifting device for the transfer arm which employs permanent magnets instead of the electro-magnets heretofore described. This device includes a permanent magnet 164 which is secured to the outer end of each transfer arm. The engaged record can be released by an unloading device which consists of a vertically movable push rod 165 which extends through a hollow transfer supporting arm 166 and has an upper end 167 projecting above the arm. An unloading lever 168 is pivoted at 169 to the top of the transfer arm and is provided with a yoke 170 at its outer end above the permanent magnet. Unloading rods 171 are mounted in the yoke and extend downwardly through guides 172 adjacent the magnet. Operation of the unloading device is obtained through reciprocation of the push rod by means of a lever 173 which can be conveniently operated from a cam on the cam shaft 54.

Operation

Figure 9:
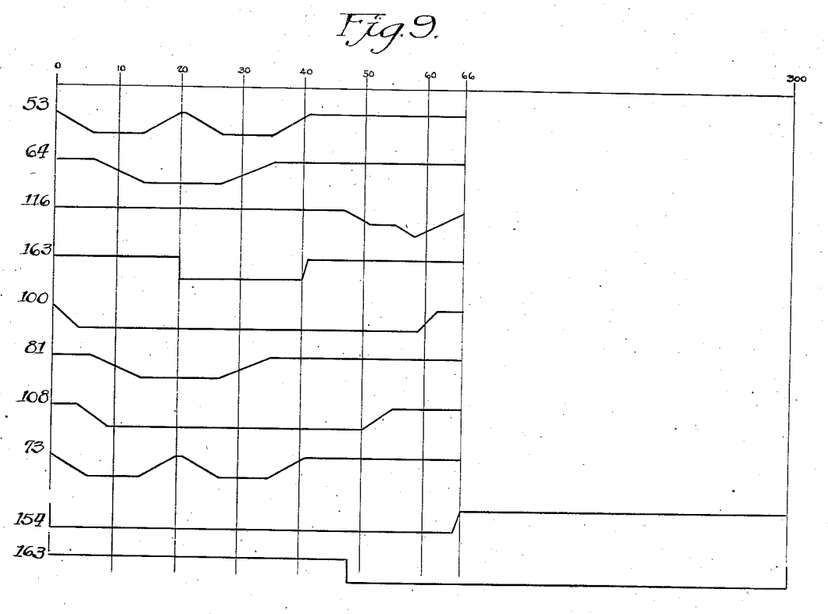
Fig. 9 is a chart showing the timing of the various cams.
Figure 10:
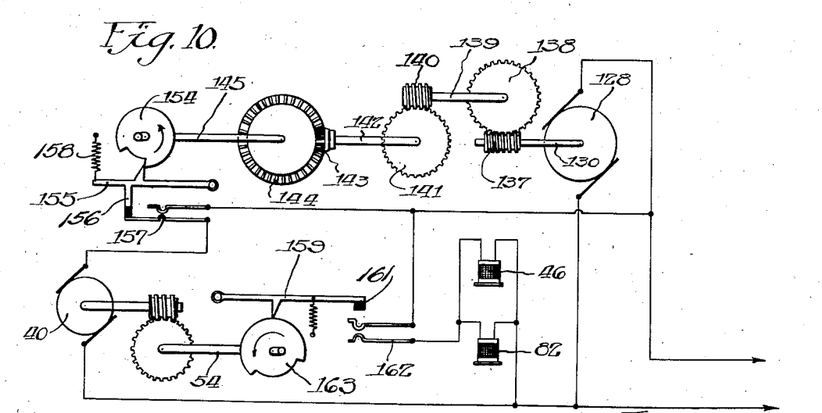
Fig. 10 is a diagrammatic view showing the relation of and means for driving the control cams.

Fig. 9 illustrates diagrammatically the timing of the various cams and the operation of their associated mechanisms. The speed of rotation of the transfer motor control cam 154 is such as to require 300 seconds of time or one revolution in five minutes. Of this period 66 seconds are required for the entire transfer operation, the remaining 244 seconds being the playing time of a record. It is, of course, apparent that the "playing time" may be changed if desired, and in this particular the apparatus is merely illustrative.

Assuming that a record has been played, the table stopped by the operation of the clutch shifting cam 147 and the cam shaft 54 started by the closing of the switch 157; the first operation will be the raising of the stylus or needle by means of the cam 100 operating the lever 98 so as to pull the sound-box lifting cord 94. This is immediately followed by the cam 108 oscillating the lever 105 so as to move the tone arm shifting rod inwardly and swing the tone arm to an inoperative position through the medium of the shifting lever 101. Simultaneously with the raising of the needle the transfer arm lifting cams 53 and 73 move the levers 47 and 69, respectively, so as to raise both the loading and unloading arms. The transfer arm swinging cams 64 and 81 then swing the transfer arms through the medium of the segments 57 and 74 so as to move the loading arm 44 over the stack of records in the magazine and position the unloading arm 66 over the played record on the phonograph table. The magnets 46 and 82 at this point are inoperative, due to the fact that the cam 163 holds the magnet control switch 162 open. The transfer arm lifting cams then lower the respective arms and the magnet control cam 163 simultaneously permits closing of the magnet control switch 162 so as to actuate the magnetic lifting means in each transfer arm. In this way the top record on the stack of unplayed records in the magazine is engaged by the loading arm while the played record on the phonograph table is engaged by the unloading arm. The transfer arm lifting cams again raise the transfer arms, this time with a record attached to each arm as described. The transfer arm swinging cams then swing the arms; the loading arm 44 being swung over the player table with the unplayed record that it has lifted from the magazine, and the unloading arm being swung over the receiver for played records. The transfer arm lifting cams then lower each transfer arm and the magnet control switch 162 is opened so as to break the current to each magnet, thus releasing the records and depositing an unplayed record upon the phonograph table and the played record upon the receiver.

During swinging movement of the loading arm toward the magazine the sprocket 32 has been rotated through the connections described so as to raise the record supporting disc 23 and place the top record in the magazine at the proper height to be engaged by the transfer arm.

After the record has been placed upon the phonograph table the stylus positioning cam 116 shifts the lever 115 so as to move the push rod 113 inwardly striking the arm 124 and swinging the tone arm over the smooth edge of the record. At this point the cam 100 permits the stylus or needle to be lowered into contact with the smooth margin of the record and the push rod 113 moves the needle into the playing groove with a yielding pressure.

The device is simple and reliable and will play a large number of records without any attention whatever.

Although I have described and illustrated what I now consider to be the preferred embodiment of my invention, I desire it to be understood that various changes, additions, omissions, and substitutions may be made in the apparatus illustrated without departing from the spirit and scope of the invention as set forth by the appended claims.

What I claim is:

1. The combination with a phonograph having a table and a motor for driving said table, of a loading mechanism for depositing a record to be played upon said table, an unloading mechanism for removing the record after playing and means controlled by said motor for operating said mechanisms in timed relation to the playing of said records.

2. The combination with a phonograph having a table and a motor for driving said table, of a loading mechanism for depositing records to be played upon said table, an unloading mechanism for removing the played records, a motor for actuating said mechanisms and timing means operated by said table driving motor for controlling the operation of said second motor.

3. The combination with a phonograph having a table and a motor for driving said table, of a loading mechanism for depositing records to be played upon said table, an unloading mechanism for removing the played records, an electric motor for operating said mechanisms and a current control cam operated by said table driving motor for controlling the operation of said second motor.

4. The combination with a phonograph having a record table, of means for positioning a record to be played on said table, means for lowering the stylus onto the marginal edge of the record on said table and for yieldingly introducing it into the playing groove thereof.

5. The combination with a phonograph having a record table, of means for positioning a record to be played on said table, means for lowering the stylus onto the marginal edge of the record on said table and for yieldingly introducing it into the playing groove thereof and means for lifting the stylus out of contact with said record after playing.

6. The combination with a phonograph having a record table, of a magazine for unplayed records, a transfer arm having magnetic lifting means for supplying said phonograph with records from said magazine, a motor for operating said transfer arm and means operated by said transfer motor for feeding records in said magazine into position to be engaged by said magnetic lifting means.

7. The combination with a phonograph having a record table, of a transfer arm adapted to position a record to be played upon said table, a magnet on said arm for lifting said record and means on said arm for engaging said record and moving it out of operative engagement with said magnet.

8. The combination with a phonograph having a table, of a transfer arm for positioning a record on said table, a magnet on said arm for lifting said record, a slidable ejector adjacent said magnet adapted to engage said record and remove it from said magnet, an ejector operating arm pivoted to said transfer arm and means for actuating said arm so as to operate said ejector.

9. The combination with a phonograph of a magazine for unplayed records, a loading mechanism for supplying said phonograph with records from said magazine, means for adjusting the position of the first record in said magazine and means for feeding successive records in said magazine into position to be engaged by said loading mechanism.

10. The combination with a phonograph of a magazine for unplayed records, a loading mechanism for supplying said phonograph with records from said magazine, means for manually adjusting the position of the first record in said magazine and means for feeding successive records in said magazine into position to be engaged by said loading mechanism.

11. The combination with a phonograph of a magazine for unplayed records, a loading mechanism for supplying said phonograph with records from said magazine, a threaded rod associated with said magazine, a nut engaging said rod, means for manually rotating said nut to place the first record in said magazine in position to be engaged by said loading mechanism and means for automatically rotating said nut so as to feed successive records in said magazine into position to be engaged by said loading mechanism.

12. The combination with a phonograph of a magazine for unplayed records, a loading mechanism for supplying said phonograph with records from said magazine, a nut adapted to shift said rod longitudinally, a shaft having a gear secured thereto for operating said nut, means for manually rotating said shaft to place the first record in said magazine in position to be engaged by said loading mechanism and means for automatically driving said shaft to feed successive records in said magazine into position to be engaged by said loading mechanism.

13. The combination in a phonograph of a screw supported table adapted to hold a plurality of unplayed records, loading mechanism for transferring records from said table to said phonograph, means for manually setting the initial height of said table so as to place the first record on said table into position to be engaged by said loading mechanism and means cooperating with said screw for elevating said table during operation of said phonograph so as to feed successive records into position to be engaged by said loading mechanism.

14. The combination with a phonograph having a rotatable record table of a support for holding a plurality of records, a transfer arm for carrying records between said support and said table, an electric motor for rotating said table, an electric motor for operating said transfer arm and means operated by said table motor for controlling the circuit of said transfer motor.

15. The combination with a phonograph having a record table of a motor for rotating said table, a support associated with said phonograph for holding a plurality of records, transfer mechanism for carrying records between said table and said support, a second electric motor for operating said transfer mechanism, a switch in the circuit of said second motor and means driven by said table motor for automatically operating said switch in timed relation to the operation of said table.

16. The combination with a phonograph having a record table of a motor for rotating said table, a support associated with said phonograph for holding a plurality of records, transfer mechanism for carrying records between said support and said table, an electric motor for operating said transfer mechanism, a switch in the circuit of said transfer motor and a cam driven by said table motor for operating said switch in timed relation to the playing of a record by said phonograph.

17. The combination in a phonograph having a tone arm and a sound box hinged thereto of means for raising said sound box after the playing of a record, an arm associated with said tone arm, a sliding rod having a lost motion connection with said arm and means for operating said rod so as to swing said tone arm to one side of said record table when said sound box is raised.

18. The combination in a phonograph having a tone arm and a sound box hinged thereto of a cam operated lever for raising said sound box after the playing of a record, a lever associated with said tone arm, a slidable rod having a lost motion connection with said tone arm lever, a cam for operating said sliding rod and means for operating said rod and said cam operated lever in synchronism.

In testimony whereof, I have hereunto subscribed my name this 20th day of December, 1924.

WILLIAM H. MARR.